(No Model.)

C. S. BEEBE.
TWO WHEELED VEHICLE.

No. 422,697. Patented Mar. 4, 1890.

Witnesses
Geo. W. Young.
N. E. Oliphant

Inventor
Charles S. Beebe
By Stout & Underwood
Attorneys

UNITED STATES PATENT OFFICE.

CHARLES S. BEEBE, OF RACINE, WISCONSIN.

TWO-WHEELED VEHICLE.

SPECIFICATION forming part of Letters Patent No. 422,697, dated March 4, 1890.

Application filed November 13, 1889. Serial No. 330,109. (No model.)

*To all whom it may concern:*

Be it known that I, CHARLES S. BEEBE, of Racine, in the county of Racine, and in the State of Wisconsin, have invented certain new and useful Improvements in Two-Wheeled Vehicles; and I do hereby declare that the following is a full, clear, and exact description thereof.

My invention relates to two-wheeled vehicles; and it consists in certain peculiarities of construction and combination of parts, to be hereinafter described with reference to the accompanying drawings, and subsequently claimed.

Figure 1:
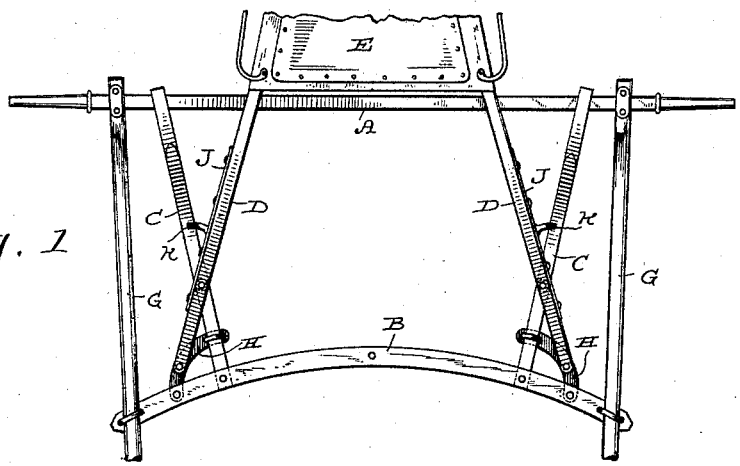
Figure 2:
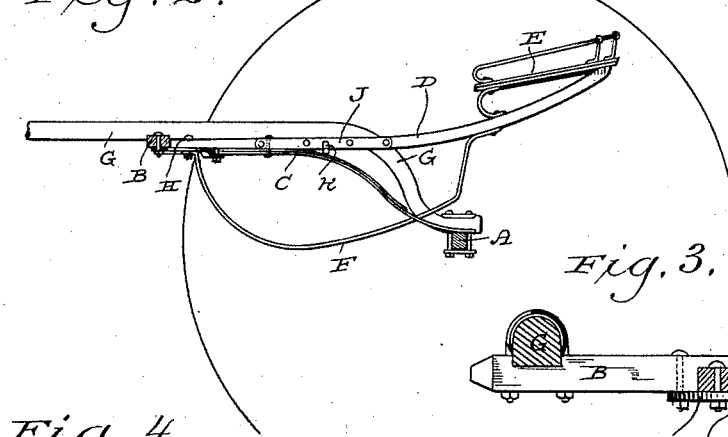
Figure 3:
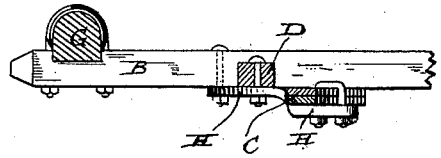

In the drawings, Figure 1 represents a plan view of a portion of a two-wheeled vehicle constructed according to my invention; Fig. 2, a side elevation of the same, partly in section; Fig. 3, a detail perspective view illustrating the means for connecting the cross-bar, seat-bars, and longitudinal springs; and Fig. 4, a plan view illustrating a yielding connection between said cross-bar, seat-bars, and longitudinal springs.

Referring by letter to the drawings, A represents the axle; B, the cross-bar; C, the longitudinal springs; D, the seat-bars that cross said springs; E, the seat; F, the foot-rest, and G the thills of that style of two-wheeled vehicle to which my invention relates. Clipped or otherwise suitably secured to the longitudinal springs C are the rear ends of curved plates H, and rigidly connected to these plates are the forward ends of the seat-bars D, the latter being also rigidly connected to said springs at the crossing-point.

Figure 4:
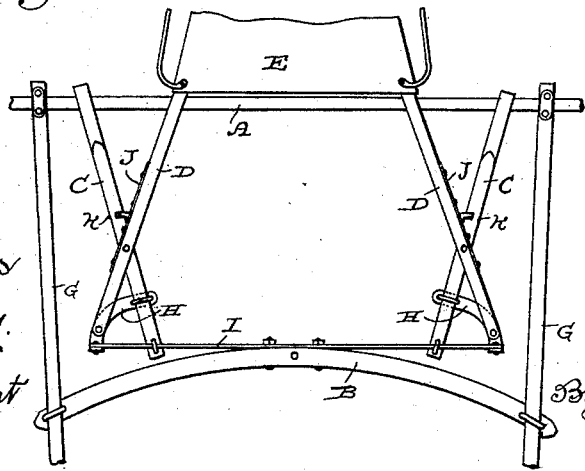

As best illustrated in Fig. 1, the front ends of the longitudinal springs C and plates H may be directly connected to the cross-bar B; but, as shown in Fig. 4, they may connect with the extremities of a transverse spring I, centrally secured to said cross-bar. In either case the rear ends of the springs C rest loosely on the axle A and are thus free to yield in a longitudinal direction, and the plates H serve as braces to strengthen the vehicle.

Bolted or otherwise rigidly secured to the outer sides of the seat-bars D are stay-plates J, provided with lateral fingers K, that rest loosely on the springs C, the points of rest for these fingers being determined with reference to the amount of stiffness desirable in said springs. In other words, the stiffness of the springs will be increased in proportion as the fingers K are set toward the rear of the vehicle.

When the transverse spring I is employed, the seat E is free to yield in a longitudinal direction and thus counteract the horse motion or other jolting of the vehicle.

Having thus described my invention, what I claim as new, and desire to secure by Letters Patent, is—

1. In a two-wheeled vehicle, the combination, with the cross-bar, longitudinal springs, and seat-bars, of brace-plates fast to the forward ends of the seat-bars and having their extremities connected to said cross-bar and springs, substantially as set forth.

2. In a two-wheeled vehicle, the combination, with the cross-bar, longitudinal springs, and seat-bars, of brace-plates having a yielding connection with said cross-bar and rigidly connected to said springs and seat-bars, substantially as set forth.

3. In a two-wheeled vehicle, the combination, with the cross-bar, of longitudinal springs connected thereto, seat-bars that cross the springs and are rigidly connected therewith at the crossing-points, and brace-plates connected to said cross-bar, springs, and seat-bars, substantially as set forth.

4. In a two-wheeled vehicle, the longitudinal springs, seat-bars arranged to cross the same, and fingers extended from the seat-bars to rest loosely on said springs, substantially as set forth.

5. In a two-wheeled vehicle, the longitudinal springs, seat-bars arranged to cross the same, stay-plates secured to the seat-bars, and fingers extended from the seat-bars to rest loosely on said springs, substantially as set forth.

6. In a two-wheeled vehicle, the combination of the cross-bar, brace-plates having their outer ends connected thereto, longitudinal springs secured to the inner ends of the brace-plates, seat-bars connected at their forward ends to said brace-plates, and fingers extended from the seat-bars to rest loosely on the springs, substantially as set forth.

In testimony that I claim the foregoing I have hereunto set my hand, at Racine, in the county of Racine and State of Wisconsin, in the presence of two witnesses.

CHARLES S. BEEBE.

Witnesses.
A. J. BLAKE,
L. C. OSBORNE.